United States Patent
Evans

(10) Patent No.: US 10,291,865 B2
(45) Date of Patent: May 14, 2019

(54) METHOD AND APPARATUS FOR IMPROVING FRAME RATE IN INFRARED SENSOR SYSTEMS

(71) Applicant: BAE SYSTEMS INFORMATION AND ELECTRONIC SYSTEMS INTEGRATION INC., Nashua, NH (US)

(72) Inventor: Peter J. Evans, Seabrook, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 198 days.

(21) Appl. No.: 15/342,192

(22) Filed: Nov. 3, 2016

(65) Prior Publication Data

US 2018/0124332 A1 May 3, 2018

(51) Int. Cl.
*H04N 5/33* (2006.01)
*H04N 5/341* (2011.01)
*H04N 5/378* (2011.01)

(52) U.S. Cl.
CPC ............. *H04N 5/33* (2013.01); *H04N 5/341* (2013.01); *H04N 5/378* (2013.01)

(58) Field of Classification Search
CPC ........... H04N 5/33; H04N 5/341; H04N 5/378
See application file for complete search history.

(56) References Cited

U.S. PATENT DOCUMENTS

| 5,459,319 A | 10/1995 | Norsworthy | |
|---|---|---|---|
| 6,946,987 B1 * | 9/2005 | Van Blerkom | H03M 1/1225 250/208.1 |
| 2005/0178952 A1 | 8/2005 | Wood | |
| 2008/0218621 A1 | 9/2008 | Cho et al. | |
| 2008/0251721 A1 | 10/2008 | Ueno | |
| 2011/0037871 A1 * | 2/2011 | Suzuki | H04N 5/378 348/222.1 |
| 2011/0157444 A1 * | 6/2011 | Gerstenberger | H04N 5/3577 348/308 |
| 2012/0033121 A1 * | 2/2012 | Kawata | H04N 5/378 348/308 |
| 2013/0119438 A1 * | 5/2013 | Kim | H01L 27/14609 257/225 |
| 2014/0078381 A1 * | 3/2014 | Ovsiannikov | H04N 5/2354 348/370 |

(Continued)

OTHER PUBLICATIONS

International Search Report, PCT/US2017/059235, dated Jan. 8, 2018, 9 pages.

*Primary Examiner* — Peter D Le

(74) *Attorney, Agent, or Firm* — Antony P. Ng; Russell Ng PLLC

(57) ABSTRACT

A scanning sensor system disclosed. The scanning sensor system induces a sensing element array and multiple analog-to-digital converters (ADCs). The sensing element array includes a group of pixels organized in a row and column configuration. During each read cycle, each pixel in an odd column of a row x is selectively connected to a corresponding one of the ADCs that is associated with the odd column pixels, while each pixel in an even column of a row $x+(N/2)+1$ is selectively connected to a corresponding one of ADCs that is associated with the even column pixels, wherein x is an integer and N is the total number of rows in the sensing element array.

9 Claims, 2 Drawing Sheets

(56) References Cited

U.S. PATENT DOCUMENTS

2014/0184866 A1* 7/2014 Ogushi .............. H04N 5/23212
348/308
2017/0214864 A1* 7/2017 Izuha .................... H04N 5/341

* cited by examiner

METHOD AND APPARATUS FOR IMPROVING FRAME RATE IN INFRARED SENSOR SYSTEMS

TECHNICAL FIELD

The present disclosure relates to infrared sensor systems in general, and in particular to a method and apparatus for improving frame rate in an infrared sensor system.

BACKGROUND

Various types of sensor systems can be employed to detect radiation, such as infrared radiation, emitted by objects within a field-of-view. The radiation emissions from those objects are then analyzed in order to obtain information regarding the characteristics and movement of those objects.

Specifically, radiation from a portion of the field-of-view is scanned across an array of detector elements, and the output signals of the detector elements are sampled and processed. The rate at which the full field-of-view can be processed is called frame rate. Spatial sample rate is scanning type sensor systems can be controlled by the detector signal sample rate and sensor scan rate. In order to provide a rapid coverage of a desired field-of-view, it is necessary to scan the image across the detector element array at a very high speed. However, this reduces the dwell time of the image upon each individual detector element, thereby reducing the amount of energy that can be integrated by each detector element to provide and output signal detectable above the noise level. Moreover, a relatively high sampling rate is required in order to obtain the desired temporal resolution.

A reduction in sampling rate can be provided by slowing the scan rate of the sensor system. However, sensor systems are typically employed where it is desired to monitor a field-of-view, detect a target, and return to the same position in the field-of-view to determine if the target has moved. It is also desirable to provide a high frame rate, that is, to rapidly return to an original field-of-view portion in order to detect variations, or modulations, in intensity of radiation emitted by the target, in order to obtain valuable information concerning the characteristics of the target. If the scan rate of scanning type sensors is slowed down to permit longer integration times and slower sampling rates, the frame rate of the system will be reduced, resulting in a corresponding reduction in the ability to frame-to-frame associate closely spaced objects and measure modulation of targets by comparing target characteristics on successive frames.

The present disclosure provides a method and apparatus for improving frame rate in scanning type sensor systems.

SUMMARY

In accordance with a preferred embodiment of the present invention, a scanning sensor system includes a sensing element array and multiple analog-to-digital converters (ADCs). The sensing element array includes a group of pixels organized in a row and column configuration. During each read cycle, each pixel in an odd column of a row x is selectively connected to a corresponding one of the ADCs that is associated with the odd column pixels, while each pixel in an even column of a row x+(N/2)+1 is selectively connected to a corresponding one of ADCs that is associated with the even column pixels, wherein x is an integer and N is the total number of rows in the sensing element array.

The features and advantages described herein are not all-inclusive and, in particular, many additional features and advantages will be apparent to one of ordinary skill in the art in view of the drawings, specification and claims. Moreover, it should be noted that the language used in the specification has been selected principally for readability and instructional purposes and not to limit the scope of the inventive subject matter.

BRIEF DESCRIPTION OF THE DRAWINGS

The invention itself, as well as its modes of use, further objects, and advantages thereof, will best to understood by reference to the following detailed description of an illustrative embodiment when read in conjunction with the accompanying drawings, wherein.

DETAILED DESCRIPTION

Figure 1:
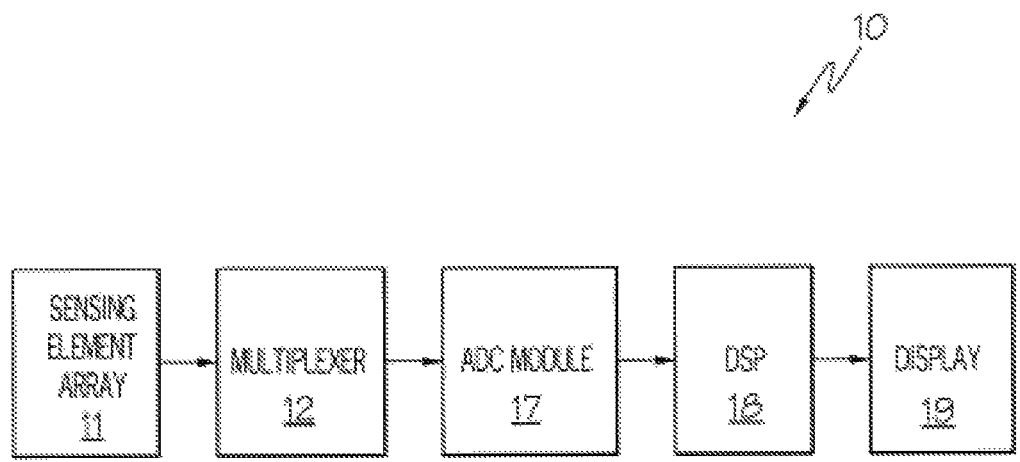
FIG. 1 is a block diagram of a scanning sensor system, in accordance with one embodiment.

Referring now to the drawings and in particular to FIG. 1, there is illustrated a block diagram of a scanning sensor system, in accordance with one embodiment. As shown, a scanning sensor system 10 includes a sensing element array 11, a multiplexer 12, an analog-to-digital converter (ADC) module, 17, a digital signal processor 18, and a display 19. Sensing element array 11 is utilized to scan in vertical and/or horizontal directions to cover a desired field-of-view. Sensing element array 11 may include multiple pixels (or sensing elements) to provide sensing and detecting functions. Sensing element array 11 is connected to multiplexer 12 for sampling the outputs of sensing element array 11. ADC module 17 includes multiple sample-and-hold circuits and ADCs for processing the received signals to provide the highest possible signal-to-noise ratio. The processed signals are then sent to digital signal processor 18 for analysis, and can be viewed on display 19.

Figure 2:
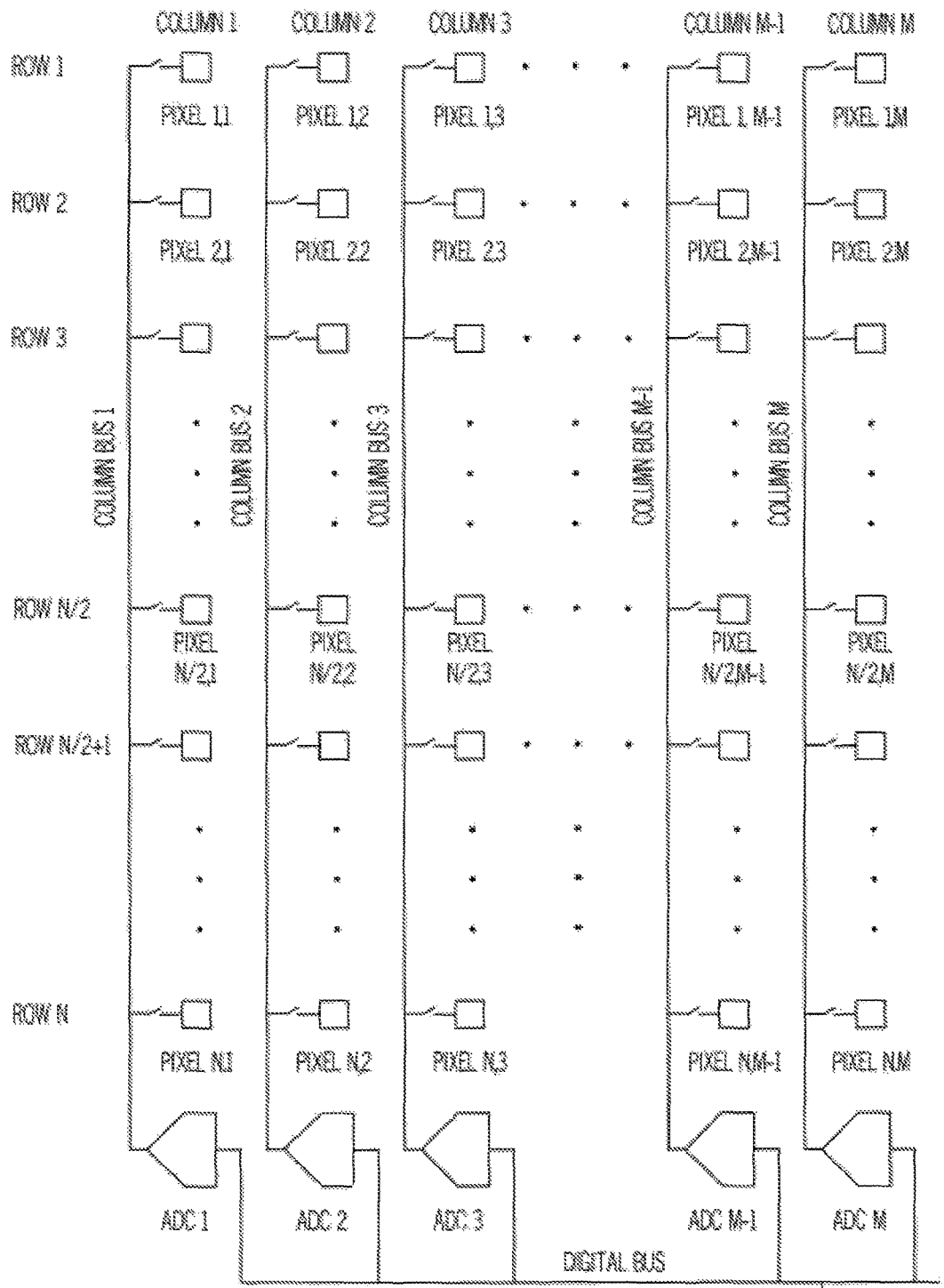
FIG. 2 illustrates the connections between pixels and analog-to-digital converters within the scanning sensor system from FIG. 1.

With reference now to FIG. 2, there is illustrated the connections between pixels within sensing element array 11 and ADCs within ADC module 17. As shown, sensing element array 11 includes multiple pixels arranged in an N rows ×M columns configuration. Each pixel within a column of sensing element array 11 can be selectively connected to a column bus and an ADC within ADC module 17 (from FIG. 1) via a switch. For example, in Column 1, each of pixel 1,1, pixel 2,1 . . . , pixel N,1 can be selectively connected to a column bus 1 and an ADC 1 via a corresponding switch; in Column 2, each of pixel 1,2, pixel 2,2 . . . , pixel N,2 can be selectively connected to a column bus 2 and an ADC 2 via a corresponding switch; in Column 3, each of pixel 1,3, pixel 2,3 . . . , pixel N,3 can be selectively connected to a column bus 3 and an ADC 3 via a corresponding switch; and each of pixel 1,M, pixel 2,M . . . , pixel N,M can be selectively connected to a column bus M and an ADC M via a corresponding switch. ADC 1 to ADC M are all connected to a digital bus 21 that leads to digital signal processor 18 (from FIG. 1).

During each read cycle (occurred after a scan cycle), one of the switches in each column will be closed to allow as associated pixel to be electrically connected to an ADC corresponding to the column. As a result, data in the chosen pixels from all the columns can be read out simultaneously from ADC 1 to ADC M via digital bus 21.

Conventionally, each row is read during each read cycle. Specifically, when a row is being read, all switches in the row being read will he closed to allow all pixels in the row being read to be connect to ADC 1 to ADC M accordingly, while all switches in other rows remain to be open. The number of read cycles matches the number of rows, and the read cycle moves through each row in a sequential manner. For example, during read cycle 1, all switches in Row 1 will be closed to allow all pixels in Row 1 to be connected to ADC 1 to ADC M accordingly; and then during read cycle 2, all switches in Row 2 will be closed to allow all pixels in Row 2 to be connected to ADC 1 to ADC M accordingly. Read cycle 1 to read cycle N correspond to reading Row 1 to Row N, respectively, in order to read the entire sensing element array 11.

In the present embodiment, a sensing element array can be conceptually divided into two sections. For example, sensing element array 11 having N rows×M columns can be conceptually divided into a first section of 1 to N/2 rows×M columns and a second section of (N/2)+1 to N rows×M columns. Data are read out from pixels in both sections concurrently during each read cycle. Thus, for each read cycle, switches in the odd columns of row x and switches in the even columns of row x+(N/2)+1 will be closed.

For example, during read cycle 1, switches in the odd columns (i.e., Columns 1, 3, 5, . . . ) in Row 1 will be closed to allow odd column pixels in Row 1 to be connected to the ADCs in the odd columns, and switches in the even columns (i.e., Columns, 2, 4, 6, . . . ) in Row (N/2)+1 will be closed to allow even column pixels in Row (N/2)+1 to be connected to the ADCs in the even columns. During read cycle 2, switches in the odd columns in Row 2 will be closed to allow odd column pixels in Row 2 to be connected to the ADCs in the odd columns, and switches in the even columns in Row (N/2)+2 will be closed to closed allow even column pixels in Row (N/2)+2 to be connected to the ADCs in the even columns. During read cycle N, switches in the odd columns in Row N/2 will be closed to allow odd column pixels in Row N to be connected to the ADCs in the odd columns, and switches in the even columns in Row N/2 will be closed to allow even column pixels in Row N/2 to be connected to the ADCs in the even columns. The read cycle then goes back to read cycle 1 to repeated above-mentioned steps.

With the present embodiment, N should be and even integer, and the display of data can occur at twice the scan rate. For example, if the scan rate of sensing element array 11 is set at a conventional rate of 60 Hz, the display of data can occur at 120 Hz. The display of the data frame can begin after half the conventional scan rate has been completed. At that time, the display frame will include odd column ADC data from row 1 to row N/2 and even column ADC data from row (N/2)+1 to row N. The next displayed frame will include even column ADC data from row 1 to row N/2 and odd column ADC data from row (N/2)+1 to row N. Data frames are displayed in the above-mentioned oscillating fashion as time progresses.

As an alternative embodiment, sensing element array 11 having N rows×M columns can be conceptually divided into a first section of 1 to N/3 rows+M columns, a second section of (N3)+1 to 2N/3×M columns, and a third section of (2N/3)+1 to N rows×M columns. Data are read out from pixels in the three sections concurrently during each read cycle. Thus, for each read cycle, switches in the s columns of row s, switches in the s+1 columns of row x+(N/3)+1, and switches in the s+2 columns of row x+(2N/3)+1 will be closed.

For example, during read cycle 1, switches in Columns 1, 4, 7, . . . in Row 1 will be closed to allow pixels in those columns in Row 1 to be connected to the ADCs in those columns, switches in Columns 2, 5, 8, . . . in Row (N/3)+1 will be closed to allow pixels in those columns in Row (N/3)+1 to be connected to the ADCs in those columns, and switches in Columns 3, 6, 9, in Row (2N/3)+1 will be closed to allow pixels in those columns in Row (2N/3)+1 to be connected to the ADCs in those columns. During read cycle 2, switches in Columns 2, 5, 8, in Row 2 will be closed to allow pixels in those columns in Row 2 to be connected to the ADCs in those columns, switches in Columns 3, 6, 9, . . . in Row (N/3)+2 will be closed to allow pixels in those columns in Row (N/3)+2 to be connected to the ADCs in those columns. and switches in Columns 4, 7, 10, in Row (2N/3)+2 will be closed to allow pixels in those columns in Row (2N/3)+2 to be connected to the ADCs in those columns. During read cycle N, switches in Columns 3x−2 in Row 1 will be closed to allow pixels in those columns in Row 1 to be connected to the ADCs in those columns, switches in Columns 3x−1 in Row (N/3)+1 will be closed to allow pixels in those columns in Row (N/3)+1 to be connected to the ADCs in those columns, and switches in Columns 3x in Row (2N/3)+1 will be closed to allow pixels in those columns in Row (2N/3)+1 to be connected to the ADCs in those columns, where x is an integer. With the alternative embodiment, N should be an integer divisible by 3, and the display of data can occur at thrice the scan rate.

The following is an explanation of why the above-mentioned steps works. Considering a conventional 60 Hz scan of a 640×480 array while ignoring frame and line blanking intervals for the sake of simplicity, the rows are connected to the column buses for a period of approximately 34 μs; i.e., $$T_{ROW} = \frac{T_{FRAME}}{N_{ROW}} = \frac{\frac{1}{60}}{480} = 34.75 \text{ μs}$$

In other words, if the pixels of Row 1 are connected to the column buses at time t=0, then the pixels of Row 2 are connected at $t=T_{row}$, the pixels of Row 3 are connected at $t=2T_{row}$, and the pixels of Row x are connected at $t=(x-1)T_{row}$.

In a fast scan mode, the odd columns continue to sample a scene as described above. However, for the even columns, Row N+1 will be sampling the scene at the same time.

With the conventional scanning method, the display of the data has a constant offset in time. In other words, if the scene is sampled at $t=t_{sample}$, then $t_{display}=t_{sample}+t_{offset}$, where $t_{offset}$ is a constant.

With the scanning method of the present embodiment, the offset is not a constant. Since Row 1 and Row 241 are being sampled simultaneously, they are looking at the scene at the same point in time. In essence, elements of the scene are being displayed out of order. The results of two simultaneous samples of the scene separated spatially are stored digitally, and are then displayed as if they were scanned in the normal order at twice the speed.

For all intended purposes, it would not be too jittery to watch the elements of the scene being displayed out of order because the time constant of the pixel elements in the system is on the order of 12 ms, meaning that its ability to respond to scene changes is slower that the re-ordered display error by about a factor of 3. Also, the majority of many scenes is fairly static, rendering re-ordering errors imperceptible. In other words, if the scene at time t looks pretty much like the scene at time t =t +t$_1$, then reordering does not affect the scene. Besides, the 4 ms reordering error may not be physiologically perceptible by human eyes.

Seekers looking for fast moving objects will see benefit from this technique so long as the reduced column resolution is not an issue. On average, the scanning technique of the present embodiment picks up objects sooner than conventional scanning techniques. If an object appears in the second section of the sensing element array, say near row 400, the row-separated scan will pick it up at 5 ms while the conventional scan does not pick it up until approximately 12 ms. Seekers would also enjoy the benefit of not having to display information to a human, if, for example, the data was being used as an input to a laser pointing device.

As has been described, the present invention provides a method and apparatus for improving frame rate in scanning sensor systems.

Through appropriate design, a read out circuit can support both a conventional mode of operation and the mode of operation as described herein, thereby increasing the utility of a scanning sensor system to a user who can switch modes as the situation demands.

While the invention has ben particularly shown and described with reference to a preferred embodiment, it will be understood by those skilled in the art that various changes in form and detail may be made therein without departing from the spirit and scape of the invention.

What is claimed is:

1. A scanning sensor system comprising:
   a sensing element array having a plurality of pixels organized in a row and column configuration;
   a plurality of switches; and
   a plurality of analog-to-digital converters (ADCs), wherein during one read cycle, each pixel in an odd column of a row x is selectively connected to a corresponding one of said plurality of ADCs in said odd column via one of said switches, while each pixel in an even column of a row x+(N/2)+1 is selectively connected to a corresponding one of said plurality of ADCs in said even column via one of said switches, wherein x is an integer and N is an even integer indicating the total number of rows in said sensing element array.

2. The scanning sensor system of claim 1, further comprising a plurality of sample-and-hold circuits coupled to said ADCs.

3. The scanning sensor system of claim 2, further comprising a processor coupled to said ADCs.

4. The scanning sensor system of claim 3, further comprising a display coupled to said processor.

5. A scanning sensor system comprising:
   a sensing element array having a plurality of pixels organized in a row and column configuration;
   a plurality of switches; and
   a plurality of analog-to-digital converters (ADCs), wherein during one read cycle, each pixel in a column 3x−2 of a row x is selectively connected to a corresponding one of said plurality of ADCs in said column 3x−2 via one of said switches, each pixel in a column 3x−1 of a row x+(N/3)+1 is selectively connected to a corresponding one of said plurality of ADCs in said column 3x−1 via one of said switches, and each pixel in a column 3x of a row x+(2N/3)+1 is selectively connected to a corresponding one of said plurality of ADCs in said column 3x via one of said switches, wherein x is an integer and N is a divisible-by-3 integer indicating the total number of rows in said sensing element array.

6. The scanning sensor system of claim 5, further comprising a plurality of sample-and-hold circuits coupled to said ADCs.

7. The scanning sensor system of claim 6, further comprising a processor coupled to said ADCs.

8. The scanning sensor system of claim 7, further comprising a display coupled to said processor.

9. A method for improving frame rate in a scanning sensor system, said method comprising:
   providing a sensing element array having a plurality of pixels organized in a row and column configuration;
   providing a plurality of analog-to-digital converters (ADCs);
   during one read cycle, selectively connecting each pixel in an odd column of a row x to a corresponding one of said plurality of ADCs in said odd column, and concurrently selectively connecting each pixel in an even column of a row x+(N/2)+1 to a corresponding one of said plurality of ADCs in said even column, wherein x is an integer and N is an even integer indicating the total number of rows in said sensing element array.

* * * * *